US010540043B2

(12) United States Patent
Tanemura et al.

(10) Patent No.: US 10,540,043 B2
(45) Date of Patent: Jan. 21, 2020

(54) HYBRID IN-CELL SENSOR TOPOLOGY

(71) Applicant: SYNAPTICS INCORPORATED, San Jose, CA (US)

(72) Inventors: Tetsuo Tanemura, Yokohama (JP); Takayuki Noto, Nakano (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 313 days.

(21) Appl. No.: 15/199,569

(22) Filed: Jun. 30, 2016

(65) Prior Publication Data

US 2017/0255295 A1 Sep. 7, 2017

Related U.S. Application Data

(60) Provisional application No. 62/302,215, filed on Mar. 2, 2016.

(51) Int. Cl.
*G06F 3/044* (2006.01)

(52) U.S. Cl.
CPC .... *G06F 3/044* (2013.01); *G06F 2203/04101* (2013.01); *G06F 2203/04103* (2013.01); *G06F 2203/04112* (2013.01)

(58) Field of Classification Search
CPC ........... G06F 3/044; G06F 2203/04101; G06F 2203/04103; G06F 2203/04112; G06F 3/041; G06F 3/0412; G06F 3/0416; G06F 1/3262; G06F 1/3265; Y02D 10/153
See application file for complete search history.

(56) References Cited

U.S. PATENT DOCUMENTS

| | | |
|---|---|---|
| 7,541,816 B1 | 6/2009 | Liao et al. |
| 8,054,300 B2 | 11/2011 | Bernstein |
| 8,462,135 B1 | 6/2013 | Xiao et al. |
| 8,487,907 B2 | 7/2013 | Huang et al. |
| 8,519,975 B2 | 8/2013 | Huang et al. |
| 8,525,801 B2 | 9/2013 | Huang et al. |
| 8,564,553 B2 | 10/2013 | Yeh et al. |
| 8,592,698 B2 | 11/2013 | Hung et al. |
| 8,605,056 B2 | 12/2013 | Mai et al. |
| 8,896,328 B2 | 11/2014 | Reynolds et al. |
| 2008/0158172 A1 | 7/2008 | Hotelling et al. |
| 2008/0309631 A1 | 12/2008 | Westerman et al. |
| 2009/0009195 A1 | 1/2009 | Seguin |
| 2009/0315841 A1 | 12/2009 | Cheng et al. |
| 2010/0026656 A1 | 2/2010 | Hotelling et al. |
| 2010/0188364 A1 | 7/2010 | Lin et al. |

(Continued)

*Primary Examiner* — Yaron Cohen
(74) *Attorney, Agent, or Firm* — Patterson + Sheridan, LLP

(57) ABSTRACT

An input device and associated processing system and method are disclosed. The input device comprises a lens layer, and a display device comprising a plurality of layers. The plurality of layers comprises a display activation layer. The input device further comprises a plurality of first sensor electrodes arranged with a first sensor pitch on a first layer of the plurality of layers, each first sensor electrode comprising at least one display electrode of a plurality of display electrodes. The input device further comprises a plurality of second sensor electrodes arranged with a second sensor pitch on a second layer between the display activation layer and the lens layer, the second sensor pitch greater than the first sensor pitch along at least one dimension of a sensing region of the input device.

22 Claims, 12 Drawing Sheets

(56) References Cited

U.S. PATENT DOCUMENTS

| | | |
|---|---|---|
| 2010/0292945 A1 | 11/2010 | Reynolds et al. |
| 2011/0007021 A1 | 1/2011 | Bernstein et al. |
| 2011/0025629 A1 | 2/2011 | Grivna et al. |
| 2011/0050632 A1 | 3/2011 | Lin et al. |
| 2011/0050633 A1 | 3/2011 | Lin et al. |
| 2011/0050634 A1 | 3/2011 | Lin et al. |
| 2011/0148436 A1 | 6/2011 | Dattalo |
| 2012/0038586 A1 | 2/2012 | Han et al. |
| 2012/0044199 A1 | 2/2012 | Karpin et al. |
| 2012/0050214 A1 | 3/2012 | Kremin et al. |
| 2012/0306806 A1 | 12/2012 | Yang et al. |
| 2012/0313881 A1 | 12/2012 | Ge et al. |
| 2013/0027346 A1 | 1/2013 | Yarosh et al. |
| 2013/0154996 A1 | 6/2013 | Trend et al. |
| 2013/0162583 A1 | 6/2013 | Simmons et al. |
| 2013/0176280 A1 | 7/2013 | Wu et al. |
| 2013/0181916 A1 | 7/2013 | Huang et al. |
| 2013/0207924 A1 | 8/2013 | Mohindra et al. |
| 2013/0215047 A1 | 8/2013 | Wu et al. |
| 2013/0215053 A1 | 8/2013 | Lin et al. |
| 2013/0222047 A1 | 8/2013 | Huang et al. |
| 2013/0241870 A1 | 9/2013 | Lin et al. |
| 2013/0249852 A1 | 9/2013 | Lin et al. |
| 2013/0257767 A1 | 10/2013 | Wu et al. |
| 2013/0257797 A1 | 10/2013 | Wu et al. |
| 2013/0299330 A1 | 11/2013 | Tao et al. |
| 2013/0307811 A1 | 11/2013 | Hanssen et al. |
| 2013/0307812 A1 | 11/2013 | Hanssen et al. |
| 2013/0307813 A1 | 11/2013 | Hanssen et al. |
| 2014/0184552 A1 | 7/2014 | Tanemura |
| 2014/0210764 A1* | 7/2014 | Shepelev ............... G06F 3/044 345/174 |
| 2015/0042600 A1* | 2/2015 | Lukanc ............... G06F 3/0412 345/174 |
| 2015/0069362 A1* | 3/2015 | Ito ............... H01L 27/323 257/40 |

* cited by examiner

| MODE 605 | ABSCAP 615 | TRANSCAP (PARTIAL) 620 | TRANSCAP 625 | COMBINED (ABSCAP + TRANSCAP) 630 | COMBINED (ABSCAP + TRANSCAP) 635 |
|---|---|---|---|---|---|
| COARSE-PITCH SENSOR ELECTRODES 420 | DRIVE AND SENSE | DRIVE/GROUND | SENSE | SENSE | DRIVE AND SENSE |
| FINE-PITCH SENSOR ELECTRODES 442 | (OPTIONAL) GUARD | SENSE | DRIVE | DRIVE AND SENSE | SENSE |
| EXAMPLE APPLICATIONS 610 | • LOW POWER (DOZE)<br>• PROXIMITY SENSING MODE | • PEN INPUT<br>• WAKEUP GESTURE<br>• GRIP DETECTION | • TRACK MULTIPLE OBJECTS | • FORCE SENSING | • STEREOSCOPIC SENSING<br>• SIDE TOUCH<br>• PEN ANGLE DETECTION<br>• KNUCKLE DETECTION |

FIG. 6

HYBRID IN-CELL SENSOR TOPOLOGY

CROSS-REFERENCE TO RELATED APPLICATIONS

This application claims benefit of U.S. provisional patent application Ser. No. 62/302,215, filed Mar. 2, 2016 entitled "Hybrid In-Cell Sensor Topology," which is herein incorporated by reference in its entirety.

BACKGROUND

Field

Embodiments of the present disclosure generally relate to techniques for operating an input device having a display device with an integrated sensing device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

One embodiment described herein is an input device comprising a lens layer, and a display device comprising a plurality of layers. The plurality of layers comprises a display activation layer. The input device further comprises a plurality of first sensor electrodes arranged with a first sensor pitch on a first layer of the plurality of layers, each first sensor electrode comprising at least one display electrode of a plurality of display electrodes. The input device further comprises a plurality of second sensor electrodes arranged with a second sensor pitch on a second layer between the display activation layer and the lens layer, the second sensor pitch greater than the first sensor pitch along at least one dimension of a sensing region of the input device.

Another embodiment described herein is a processing system for an input device. The processing system comprises sensing circuitry configured to couple with a plurality of first sensor electrodes and a plurality of second sensor electrodes. The plurality of first sensor electrodes is arranged with a first sensor pitch at a first layer of the input device, each first sensor electrode comprising at least one display electrode of a plurality of display electrodes. The plurality of second sensor electrodes is arranged with a second sensor pitch at a second layer between a display activation layer and a lens layer of the input device, the second sensor pitch greater than the first sensor pitch along at least one dimension of a sensing region of the input device. The sensing circuitry is further configured to operate the plurality of second sensor electrodes in a first predefined sensing mode by driving the plurality of second sensor electrodes with first capacitive sensing signals to determine at least a presence or absence of an input object in a sensing region of the input device. The sensing circuitry is further configured to operate, based on a determination of the presence of the input object in the sensing region, the plurality of first sensor electrodes in a second predefined sensing mode by driving the plurality of first sensor electrodes with second capacitive sensing signals to determine a location of the input object.

Another embodiment described herein is a method of operating an input device comprising a plurality of layers and defining a sensing region, the plurality of layers comprising a lens layer and a display activation layer. The method comprises operating a plurality of coarse-pitch sensor electrodes in a first predefined sensing mode by driving the coarse-pitch sensor electrodes with first capacitive sensing signals to determine at least a presence or absence of an input object in the sensing region, the coarse-pitch sensor electrodes disposed at a first layer of the plurality of layers. The method further comprises operating, based on a determination of the presence of the input object in the sensing region, a plurality of fine-pitch sensor electrodes in a second predefined sensing mode by driving the fine-pitch sensor electrodes with second capacitive sensing signals to determine a location of the input object, the fine-pitch sensor electrodes disposed at a second layer of the plurality of layers between the display activation layer and the lens layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 6 is a chart describing a plurality of predefined sensing modes, according to one embodiment.

Figure 1:
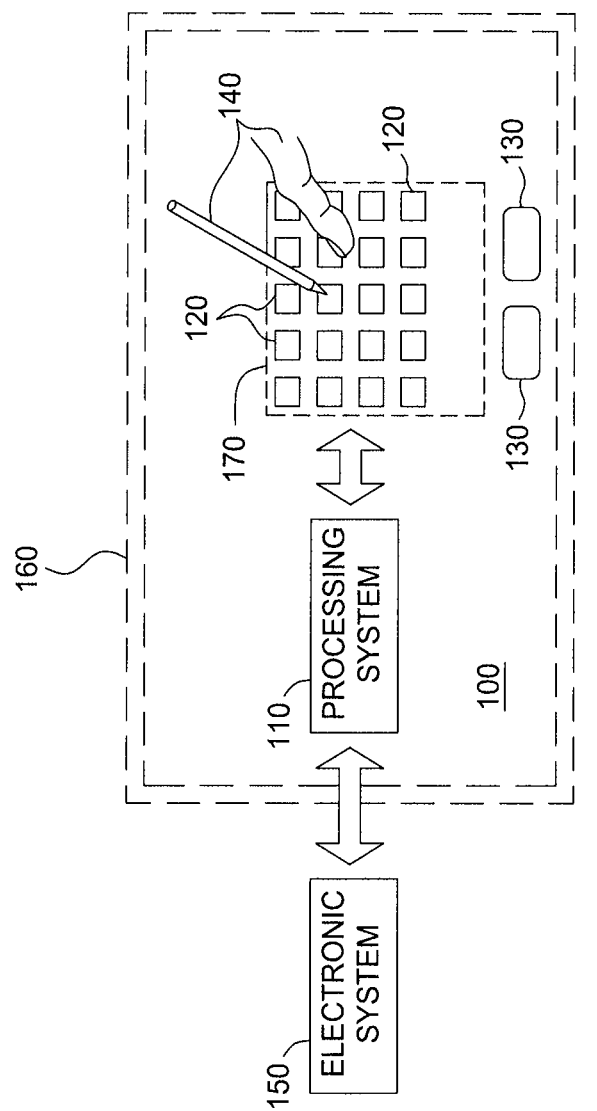
FIG. 1 is a schematic block diagram of an input device, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or in the following detailed description.

Embodiments described herein generally include an input device comprising a plurality of coarse-pitch sensor electrodes disposed at a first layer of the input device and a plurality of fine-pitch sensor electrodes disposed at a second layer of the input device. Each of the fine-pitch sensor electrodes comprises at least one display electrode of a plurality of display electrodes. Each of the coarse-pitch sensor electrodes generally overlaps with two or more of the fine-pitch sensor electrodes.

Employing multiple layers of overlapping sensor electrodes provides numerous benefits for improved input sensing performance and/or reduced power consumption. In some embodiments, the coarse-pitch sensor electrodes are operated in a first sensing mode to perform a low-resolution sensing of an input object. When an input object is detected in the first mode, a second sensing mode is entered and a "focused" portion of the fine-pitch sensor electrodes are operated to provide a higher-resolution sensing of the input object. Further, the multiple layers of overlapping sensor electrodes may be operated in a number of distinct sensing modes to selectively prioritize sensing performance or power conservation, and/or to enable advanced sensing features.

Exemplary Input Device Implementations

FIG. 1 is a schematic block diagram of an input device 100, in accordance with embodiments of the present technology. In various embodiments, input device 100 comprises a display device integrated with a sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field.

Nearby input objects cause changes in the electric field, and produce detectable changes in capacitive coupling that may be detected as changes in voltage, current, or the like.

Some capacitive implementations utilize arrays or other regular or irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self-capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Exemplary Sensor Electrode Arrangements

Figure 2:
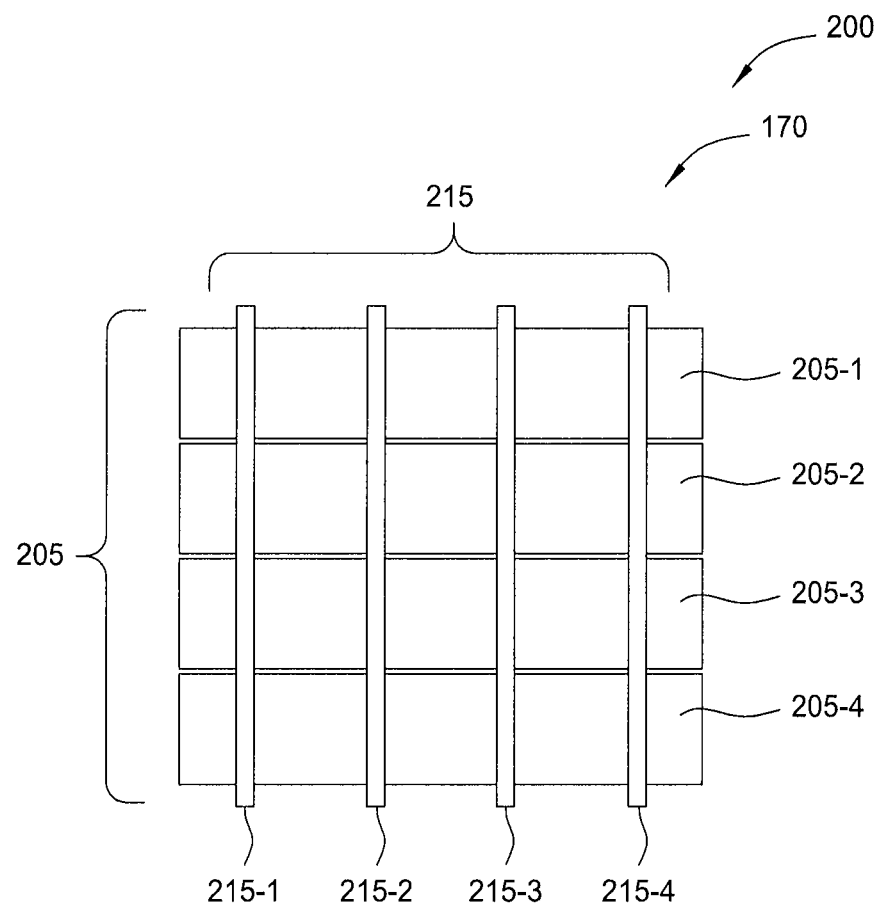
FIGS. 2 and 3 illustrate portions of exemplary sensor electrode arrangements, according to one embodiment.
Figure 3:
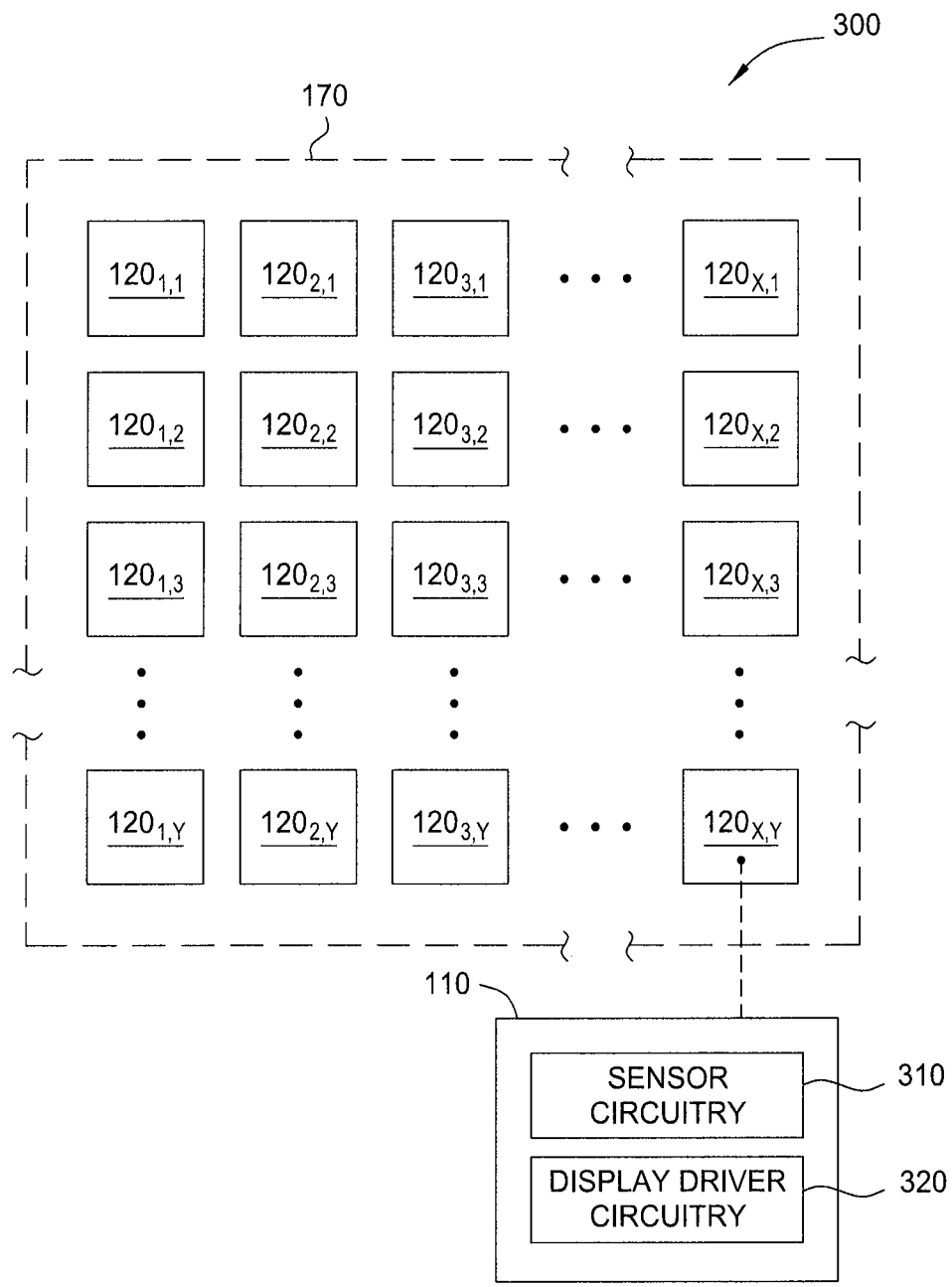

FIGS. 2 and 3 illustrate portions of exemplary sensor electrode arrangements, according to embodiments described herein. Specifically, arrangement 200 (FIG. 2) illustrates a portion of a pattern of sensor electrodes configured to sense in a sensing region 170 associated with the pattern, according to several embodiments. For clarity of illustration and description, FIG. 2 shows the sensor electrodes in a pattern of simple rectangles, and does not show various associated components. This pattern of sensing electrodes comprises a first plurality of sensor electrodes 205 (e.g., 205-1, 205-2, 205-3, 205-4), and a second plurality of sensor electrodes 215 (e.g., 215-1, 215-2, 215-3, 215-4). The sensor electrodes 205, 215 are each examples of the sensor electrodes 120 discussed above. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other. In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together.

The pluralities of sensor electrodes 205, 215 may be formed into any desired shapes. Moreover, the size and/or shape of the sensor electrodes 205 may be different than the size and/or shape of the sensor electrodes 215. Additionally, sensor electrodes 205, 215 located on a same side of a substrate may have different shapes and/or sizes. In one embodiment, the first plurality of sensor electrodes 205 may be larger (e.g., having a larger surface area) than the second plurality of sensor electrodes 215, although this is not a requirement. In other embodiments, the first and second pluralities of sensor electrodes 205, 215 may have a similar size and/or shape.

In one embodiment, the first plurality of sensor electrodes 205 extends substantially in a first direction while the second plurality of sensor electrodes 215 extends substantially in a second direction. For example, and as shown in FIG. 2, the first plurality of sensor electrodes 205 extend in one direction, while the second plurality of sensor electrodes 215 extend in a direction substantially orthogonal to the sensor electrodes 205. Other orientations are also possible (e.g., parallel or other relative orientations).

In some embodiments, both the first and second pluralities of sensor electrodes 205, 215 are located outside of a plurality (or display stack) of layers that together form the display device 160. One example of a display stack may include layers such as a lens layer, a one or more polarizer layers, a color filter layer, one or more display electrodes layers, a display material layer, a thin-film transistor (TFT) glass layer, and a backlight layer. However, other arrangements of a display stack are possible. In other embodiments, one or both of the first and second pluralities of sensor electrodes 205, 215 are located within the display stack, whether included as part of a display-related layer or a separate layer. For example, Vcom electrodes within a particular display electrode layer can be configured to perform both display updating and capacitive sensing.

Arrangement 300 of FIG. 3 illustrates a portion of a pattern of sensor electrodes configured to sense in sensing region 170, according to several embodiments. For clarity of illustration and description, FIG. 3 shows the sensor electrodes 120 in a pattern of simple rectangles and does not show other associated components. The exemplary pattern comprises an array of sensor electrodes $120_{X,Y}$ arranged in X columns and Y rows, wherein X and Y are positive integers, although one of X and Y may be zero. It is contemplated that the pattern of sensor electrodes 120 may have other configurations, such as polar arrays, repeating patterns, non-repeating patterns, a single row or column, or other suitable arrangement. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 is coupled to the processing system 110 and utilized to determine the presence (or lack thereof) of an input object in the sensing region 170.

In a first mode of operation, the arrangement of sensor electrodes 120 ($120_{1,1}$, $120_{2,1}$, $120_{3,1}$, . . . , $120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

In some embodiments, the arrangement 300 includes one or more grid electrodes (not shown) that are disposed between at least two of the sensor electrodes 120. The grid electrode(s) may at least partially circumscribe the plurality of sensor electrodes 120 as a group, and may also, or in the alternative, completely or partially circumscribe one or more of the sensor electrodes 120. In one embodiment, the grid electrode is a planar body having a plurality of apertures, where each aperture circumscribes a respective one of the sensor electrodes 120. In other embodiments, the grid electrode(s) comprise a plurality of segments that may be driven individually or in groups or two or more segments. The grid electrode(s) may be fabricated similar to the sensor electrodes 120. The grid electrode(s), along with sensor electrodes 120, may be coupled to the processing system 110 utilizing conductive routing traces and used for input object detection.

The sensor electrodes 120 are typically ohmically isolated from each other, and are also ohmically isolated from the grid electrode(s). That is, one or more insulators separate the sensor electrodes 120 and grid electrode(s) and prevent them from electrically shorting to each other. In some embodiments, the sensor electrodes 120 and grid electrode(s) are separated by an insulative gap, which may be filled with an electrically insulating material, or may be an air gap. In some embodiments, the sensor electrodes 120 and the grid electrode(s) are vertically separated by one or more layers of insulative material. In some other embodiments, the sensor electrodes 120 and the grid electrode(s) are separated by one or more substrates; for example, they may be disposed on opposite sides of the same substrate, or on different substrates. In yet other embodiments, the grid electrode(s) may be composed of multiple layers on the same substrate, or on different substrates. In one embodiment, a first grid electrode may be formed on a first substrate (or a first side of a substrate) and a second grid electrode may be formed on a second substrate (or a second side of a substrate). For example, a first grid electrode comprises one or more common electrodes disposed on a thin-film transistor (TFT) layer of the display device 160 (FIG. 1) and a second grid electrode is disposed on the color filter glass of the display device 160. The dimensions of the first and second grid electrodes can be equal or differ in at least one dimension.

In a second mode of operation, the sensor electrodes 120 ($120_{1,1}$, $120_{2,1}$, $120_{3,1}$, . . . , $120_{X,Y}$) may be utilized to detect the presence of an input object via transcapacitive sensing techniques when a transmitter signal is driven onto the grid electrode(s). That is, processing system 110 is configured to drive the grid electrode(s) with a transmitter signal and to receive resulting signals with each sensor electrode 120, where a resulting signal comprising effects corresponding to the transmitter signal, which is utilized by the processing system 110 or other processor to determine the position of the input object. In another embodiment, the processing system is configured to drive sensor electrode(s) 120 and to receive resulting signals with the grid electrode(s).

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in the first mode of operation, between the sensor electrodes 120 and grid electrode(s) in the second mode of operation, and between groups of sensor electrodes 120 used as transmitter and receiver electrodes (e.g., arrangement 200 of FIG. 2). The capacitive coupling changes with the proximity and motion of input objects in the sensing region 170 associated with the sensor electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode 120 with a transmitter or other signal and/or voltage potential. In one embodiment, the switching element may be configured to couple more than one receiver electrode to a common receiver at the same time.

In other embodiments, "scanning" sensor electrodes 120 to determine these capacitive couplings comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least a portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move at least one of a host IC and a display driver out of a "doze" mode or low-power mode. The coarse capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the active matrix display such as one or more segments of a segmented Vcom electrode (common electrode(s)), a source drive line, gate line, an anode sub-pixel electrode or cathode pixel electrode, or any other suitable display element. These display electrodes may be disposed on an appropriate display screen substrate. For example, the common electrodes may be disposed on the a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more display electrodes. In other embodiments, at least two sensor electrodes 120 may share at least one display electrode. While the following description may describe sensor electrodes 120 and/or grid electrode(s) as comprising one or more common electrodes, various other display electrodes as described above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 3, the processing system 110 coupled to the sensor electrodes 120 includes a sensor circuitry 310 and optionally, a display driver circuitry 320. The sensor circuitry 310 and/or display driver circuitry 320 is part of a larger processing system 110 that further comprises firmware, software, and/or other hardware elements. The sensor circuitry 310 includes circuitry configured to drive at least one of the sensor electrodes 120 for capacitive sensing during periods in which input sensing is desired. In one embodiment, the sensor circuitry 310 is configured to drive a modulated signal onto the at least one sensor electrode 120 to detect changes in absolute capacitance between the at least one sensor electrode and an input object. In another embodiment, the sensor circuitry 310 is configured to drive a transmitter signal onto the at least one sensor electrode 120 to detect changes in a transcapacitance between the at least one sensor electrode and another sensor electrode 120. The modulated and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The sensor circuitry 310 may be selectively coupled one or more of the sensor electrodes 120 and/or the grid electrode(s). For example, the sensor circuitry 310 may be coupled selected portions of the sensor electrodes 120 and operate in either an absolute or transcapacitive sensing mode. In another example, the sensor circuitry 310 may be a different portion of the sensor electrodes 120 and operate in either an absolute or transcapacitive sensing mode. In yet another example, the sensor circuitry 310 may be coupled to all the sensor electrodes 120 and operate in either an absolute or transcapacitive sensing mode.

The sensor circuitry 310 is configured to operate the grid electrode(s) as a shield electrode that may shield sensor electrodes 120 from the electrical effects of nearby conductors. In one embodiment, the processing system is configured to operate the grid electrode(s) as a shield electrode that may "shield" sensor electrodes 120 from the electrical effects of nearby conductors, and to guard the sensor electrodes 120 from grid electrode(s), at least partially reducing the parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (i.e., non-modulated) signal. In another embodiment, operating the grid electrode(s) as a shield electrode may comprise electrically floating the grid electrode. In one embodiment, grid electrode(s) are able to operate as an effective shield electrode while being electrode floated due to its large coupling to the other sensor electrodes. In other embodiment, the shielding signal may be referred to as a "guarding signal" where the guarding signal is a varying voltage signal having at least one of a similar phase, frequency, and amplitude as the modulated signal driven on to the sensor electrodes. In one or more embodiment, routing traces may be shielded from responding to an input object due to routing beneath the grid electrode(s) and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor circuitry 310 and display driver circuitry 320 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor circuitry 310 includes circuitry configured to receive resulting signals with the sensor electrodes 120 and/or grid electrode(s) comprising effects corresponding to the modulated signals or the transmitter signals during periods in which input sensing is desired. The sensor circuitry 310 may determine a position of the input object in the sensing region 170 or may provide a signal including information indicative of the resulting signal to another module or processor, for example, a determination circuitry 330 or a processor of an associated electronic device 150 (i.e., a host processor), for determining the position of the input object in the sensing region 170.

The display driver circuitry 320 may be included in or separate from the processing system 110. The display driver circuitry 320 includes circuitry configured to provide display image update information to the display of the display device 160 during non-sensing (e.g., display updating) periods.

In one embodiment, the processing system 110 comprises a first integrated controller comprising the display driver circuitry 320 and at least a portion of the sensor circuitry 310 (i.e., transmitter module and/or receiver module). In another embodiment, the processing system 110 comprises a first integrated controller comprising the display driver circuitry 320 and a second integrated controller comprising the sensor circuitry 310. In yet another embodiment, the processing system comprises a first integrated controller comprising display driver circuitry 320 and a first portion of the sensor circuitry 310 (e.g., one of a transmitter module and a receiver module) and a second integrated controller comprising a second portion of the sensor circuitry 310 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

In some embodiments a processor of the processing system 110 may be configured to determine a position of the input object in the sensing region 170. The processor may be further configured to perform other functions related to coordinating the operation of various components of the processing system 110. In an alternate embodiment, some or all of the functionality attributed to the processor may be provided by a processor external to the processing system 110 (e.g., a host processor of an associated electronic system).

Figure 4:
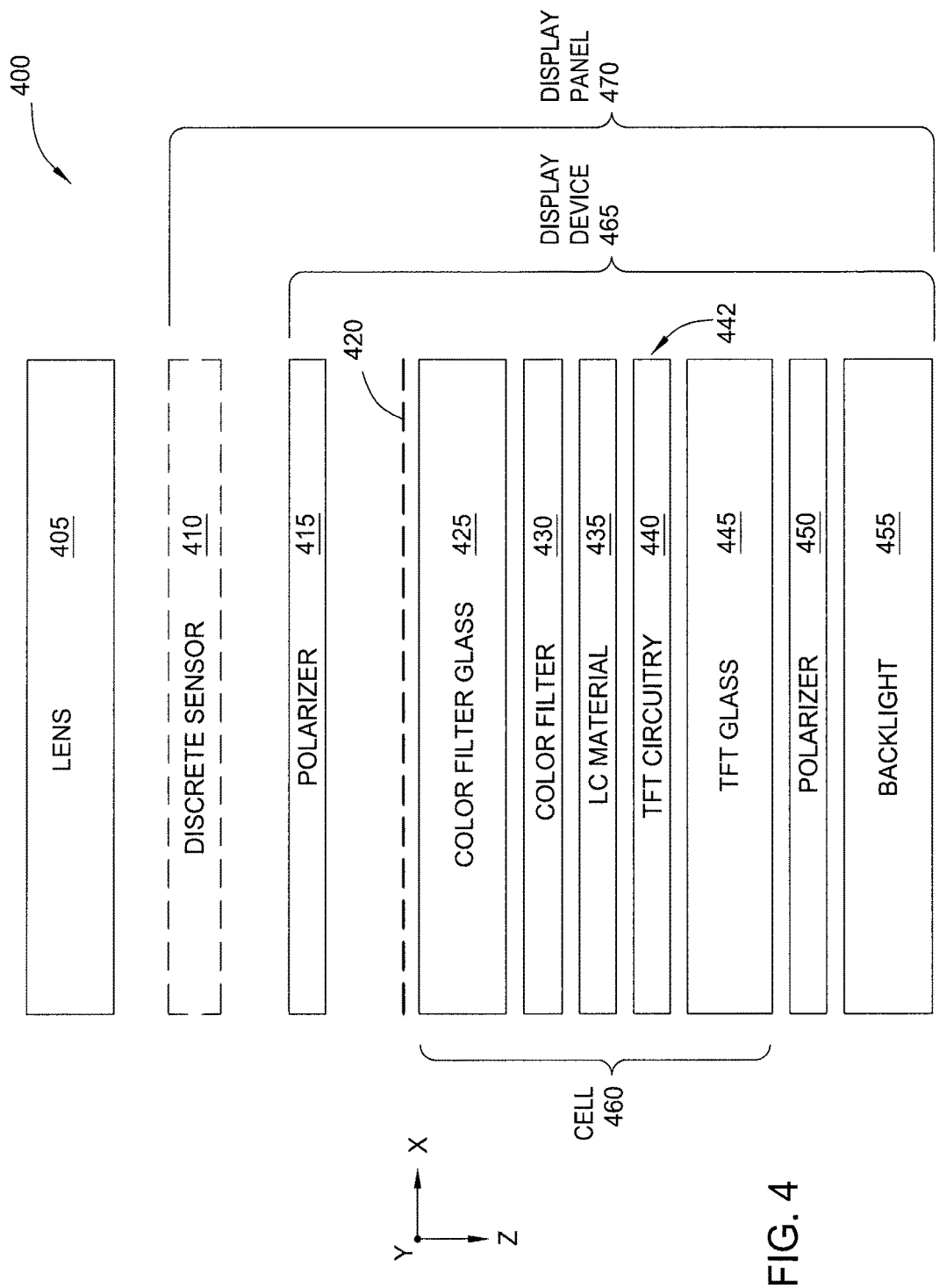
FIG. 4 illustrates an exemplary sensor electrode arrangement within a plurality of layers of an input device, according to one embodiment.

Exemplary Multiple-Layer Arrangements Having Coarse-Pitch and Fine-Pitch Sensor Electrodes FIG. 4 illustrates an exemplary sensor electrode arrangement within a plurality of layers of an input device, according to one embodiment. More specifically, FIG. 4 provides a cross-sectional view of an input device 400 comprising a display device 465. Note that the various layers depicted within the input device 400 are not drawn to scale, and the layers may be laminated together or otherwise connected within the input device 400. The depicted input device 400 is meant as one non-limiting example, as suitable alternate arrangements of the input device 400 can include more or less layers, may arrange the layers with a different order, etc.

The display device 465 comprises a plurality of layers beneath a lens layer 405. The lens layer 405 is generally optically transmissive and may be formed of glass, plastic, or other suitable material. In some cases, the display device 465 is included as part of a display panel 470 having a discrete sensor layer 410 disposed between the lens layer 405 and the display device 465. As shown, the display device 465 includes a polarizer layer 415, a color filter glass layer 425, a color filter layer 430, a liquid crystal (LC) material layer 435, a thin-film transistor (TFT) circuitry layer 440, a TFT glass layer 445, a polarizer layer 450, and a backlight layer 455. The TFT circuitry layer 440 may alternately be referred to as a display activation layer. In some OLED implementations of the display device 465, the TFT glass layer 445 may be replaced with a flexible material. Further, some OLED implementations may selectively emit different colored light, such that the color filter glass layer 425 and/or color filter layer 430 are not required.

As shown, a first layer 420 of sensor electrodes is disposed between the color filter glass layer 425 and the polarizer 415. In some embodiments, the sensor electrodes of the first layer 420 may be deposited onto the color filter glass layer 425. In some embodiments, the sensor electrodes of the first layer 420 are formed of an optically transmissive conductive material, such as indium tin oxide (ITO). In other embodiments, the sensor electrodes of the first layer 420 are formed of a non-transmissive conductive material but arranged in such a manner as to be substantially optically transmissive. For example, the sensor electrodes may be formed as a wire mesh having suitably small wire strands (e.g., on the order of 1-2 microns) disposed with a suitably large spacing between adjacent wire strands.

A second layer 442 of sensor electrodes is included within the TFT circuitry layer 440. In some embodiments, the TFT circuitry layer 440 comprises a plurality of common electrodes (Vcom) of the display device 465. In some embodiments, and as shown, a display cell 460 is defined between color filter glass layer 425 and TFT glass layer 445. The first layer 420 of sensor electrodes is disposed outside of the display cell 460, and the second layer 442 of sensor electrodes is disposed within the display cell 460. In alternate embodiments, the first layer 420 of sensor electrodes may be disposed at an alternate location within the display cell 460, i.e., between color filter glass layer 425 and TFT glass layer 445.

Figure 5:
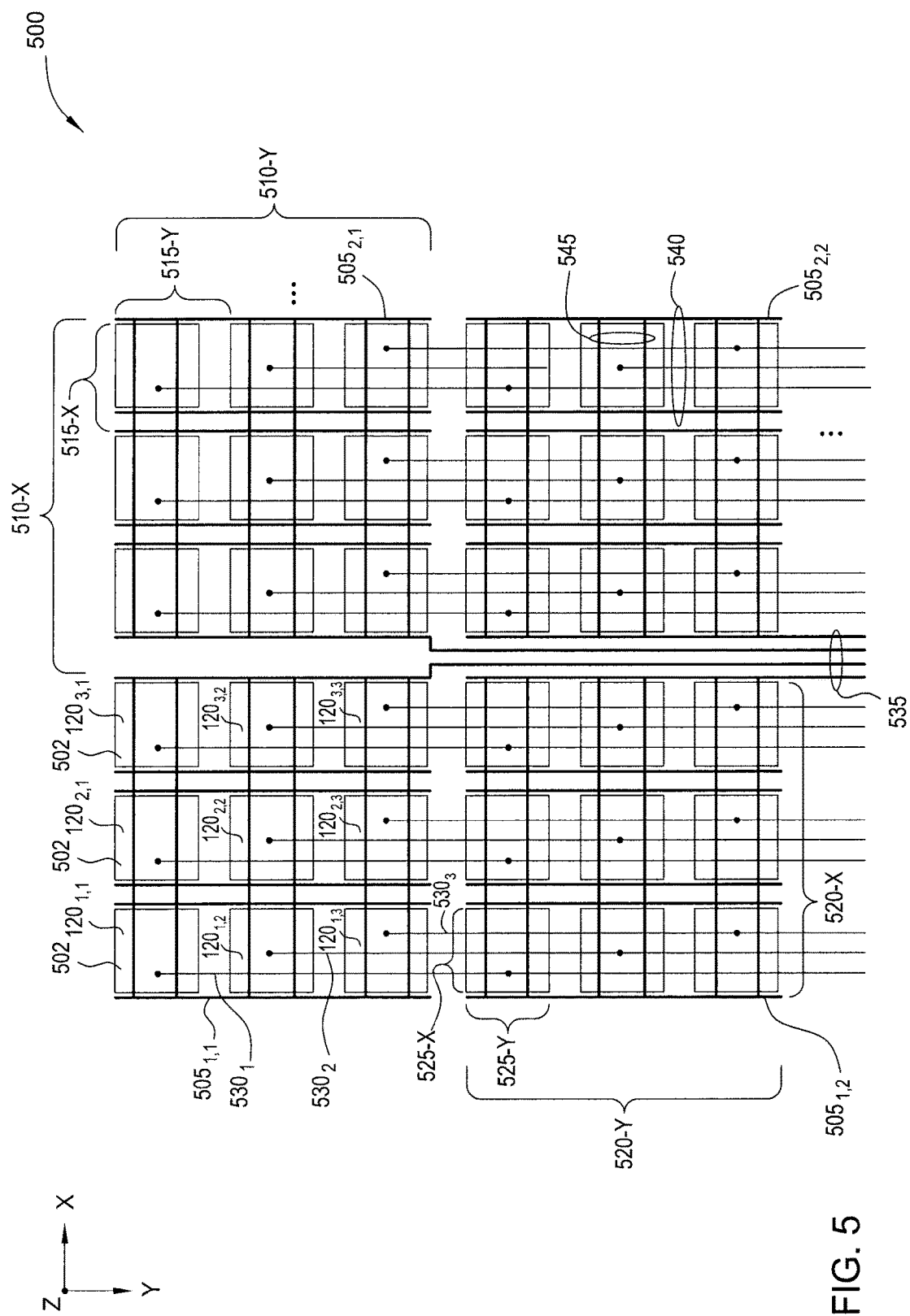
FIG. 5 illustrates an exemplary sensor electrode arrangement, according to one embodiment.

FIG. 5 illustrates an exemplary sensor electrode arrangement, according to one embodiment. More specifically, arrangement 500 provides a relative arrangement of the first layer and second layers of sensor electrodes, which are discussed above with respective to FIG. 4. Note that the geometries and spacing of the various sensor electrodes are not drawn to scale.

Within arrangement 500, a plurality of fine-pitch sensor electrodes 502 are disposed at a first layer (e.g., at a first level in Z-dimension), and a plurality of coarse-pitch sensor electrodes $505_{1,1}$, $505_{2,1}$, $505_{1,2}$, and $505_{2,2}$ (generically referred to as coarse-pitch sensor electrode(s) 505) are disposed at a second layer. For example, using the implementation shown in FIG. 4, the plurality of fine-pitch sensor electrodes 502 are disposed at first layer 442, and the plurality of coarse-pitch sensor electrodes are disposed at second layer 420. In some embodiments, each of the fine-pitch sensor electrodes 502 comprises at least one display electrode, such as a segment of a segmented Vcom electrode. In some embodiments, the coarse-pitch sensor electrodes 505 are disposed outside of the display cell, such as between a color filter glass layer and a lens layer of an associated input device.

In some embodiments, the fine-pitch sensor electrodes 502 are arranged within the first layer in a rectangular array configuration of rows and columns. Alternately, the fine-pitch sensor electrodes 502 may have any suitable repeating arrangement. As shown, the fine-pitch sensor electrodes 502 are disposed with a pitch comprising an X-dimension pitch 515-X and a Y-dimension pitch 515-Y. The coarse-pitch sensor electrodes 505 are disposed within the second layer with a pitch comprising an X-dimension pitch 510-X and a Y-dimension pitch 510-Y. Other embodiments may have the fine-pitch sensor electrodes 502 and/or coarse-pitch sensor electrodes 505 arranged with a pitch in different dimensions, such as radial dimensions, off-axis dimensions, and so forth.

Generally, the X-dimension pitch 510-X of each coarse-pitch sensor electrode 505 is greater than the X-dimension pitch 515-X of each fine-pitch sensor electrode 502 and/or the Y-dimension pitch 510-Y is greater than the Y-dimension pitch 515-Y. In one embodiment, only one of the X-dimension pitch 510-X and the Y-dimension pitch 510-Y of the coarse-pitch sensor electrodes 505 is greater than the corresponding X-dimension pitch 515-X or the Y-dimension pitch 515-Y of the fine-pitch sensor electrodes 502. In another embodiment, both of the X-dimension pitch 510-X and the Y-dimension pitch 510-Y of the coarse-pitch sensor electrodes 505 are greater than the corresponding X-dimension pitch 515-X and the Y-dimension pitch 515-Y of the fine-pitch sensor electrodes 502.

The fine-pitch sensor electrodes 502 each have a profile (or extent) comprising an X-dimension profile 525-X and a Y-dimension profile 525-Y. The coarse-pitch sensor electrodes 505 each have a profile comprising an X-dimension profile 520-X and a Y-dimension profile 520-Y. Further, the profiles of the fine-pitch sensor electrodes 502 and coarse-pitch sensor electrodes 505 may have any suitable geometric shape(s) and generally do not span the entire width or length of the sensing surface. Some non-limiting examples include rectangular, square, circular, elliptical, pentagonal, hexagonal, and so forth. Generally, at least one of the X-dimension profile 520-X and the Y-dimension profile 520-Y of each coarse-pitch sensor electrode 505 is greater than a corresponding X-dimension pitch 525-X or Y-dimension pitch 525-Y of each fine-pitch sensor electrode 502. In some embodiments, both the X-dimension profile 520-X and the Y-dimension profile 520-Y of each coarse-pitch sensor electrode 505 is greater than a corresponding X-dimension pitch 525-X and Y-dimension pitch 525-Y of each fine-pitch sensor electrode 502

In some embodiments, the fine-pitch sensor electrodes 502 and/or coarse-pitch sensor electrodes 505 each have a substantially equilateral profile within the X and Y-dimensions. As discussed herein, a "substantially equilateral profile" is not limited to the case of identical lengths within the X and Y-dimensions, but refers to a ratio of an X-dimension profile to a Y-dimension profile of the fine-pitch sensor electrodes 502 or coarse-pitch sensor electrodes 505 between about 1:4 and about 4:1. Beneficially, fine-pitch sensor electrodes 502 and/or coarse-pitch sensor electrodes 505 with substantially equilateral profiles are generally capable of input sensing with a higher signal-to-noise ratio (SNR), when compared with the input sensing of elongated sensor electrodes.

In some embodiments, the fine-pitch sensor electrodes 502 are formed of an optically transmissive conductive material, and form a solid geometric shape having a substantial areal extent within its profiles 525-X, 525-Y. The coarse-pitch sensor electrodes 505 are each formed in a respective lattice configuration within its profiles 520-X, 520-Y. Beneficially, the lattice configuration of the coarse-pitch sensor electrodes 505 provides a lower background capacitance when performing input sensing measurements. The lattice configuration (or any similarly sparse pattern of coarse-pitch sensor electrodes 505) enables transcapacitive sensing with the fine-pitch sensor electrodes 502 underneath, allowing an input object above the coarse-pitch sensor electrodes 505 to intercept field lines of the electric field formed between the two types of sensor electrodes. In other words, the patterning of the coarse-pitch sensor electrodes 505 allows input object(s) to interact with more intersections of the different sensor electrodes 502, 505, and in this manner the input object can cause a greater change in capacitive coupling between the sensor electrodes 502, 505. This is compared to a system where both layers of sensor electrodes have a "solid" shape, and the input object affects the sensor electrodes 502, 505 only at areas of intersection near their respective edges.

Likewise, electric field lines originating from the fine-pitch sensor electrodes 502 during absolute capacitive sensing are allowed to penetrate through the voids of the lattice configuration of coarse-pitch sensor electrodes 505 to be terminated by an input object above the coarse-pitch sensor electrodes 505. In this way, an input object affects a greater number of fine-pitch sensor electrodes 502 based on this layout as there is a reduced overlap area between the different layers of sensor electrodes 502, 505.

Other benefits may be achieved using this multi-layer configuration of sensor electrodes, such as better immunity against a "low ground mass" phenomenon. Generally, "low ground mass" refers to the situation when a ground mass of the input device is less than a ground mass of the user. This occurs when the input object is "floating" (e.g., resting on a table). Since the user and input object have different "ground" potentials, when the user interacts with the input device, errors and artifacts may occur. One way to limit the effects of low ground mass is to limit the amount of direct capacitive coupling between the sensor electrodes and the input object. One example way to limit the amount of direct capacitive coupling is to limit the size of the receiver sensor electrodes. In this case, thinner receiver electrodes, such as the lattice configuration of coarse-pitch sensor electrodes 505 is better.

In some embodiments, the coarse-pitch sensor electrodes 505 are formed of an optically transmissive conductive material. In other embodiments, the coarse-pitch sensor electrodes 505 are formed of a non-transmissive conductive material, such as a wire mesh material.

In some embodiments, the lattice of each coarse-pitch sensor electrode 505 is formed of a plurality of electrode segments 540, 545. As shown, the electrode segments 540 extend along the Y-dimension, and the electrode segments 545 extend along the X-dimension. Each fine-pitch sensor electrode 502 is bounded in the X-dimension by two electrode segments 540, and is overlapped by two electrode segments 545. The two electrode segments 540 extend along an entire sub-column of three fine-pitch sensor electrodes 502, and the two electrode segments 545 extend along an entire sub-row of three fine-pitch sensor electrodes 502. Beneficially, the use of two sensor electrodes in each dimension tends to provide a more uniform input sensing response. However, other embodiments may include greater or fewer sensor electrodes in one or both dimensions.

In some embodiments, each of the coarse-pitch sensor electrodes 505 overlaps with two or more of the fine-pitch sensor electrodes 502. As shown, each coarse-pitch sensor electrode 505 overlaps nine fine-pitch sensor electrodes 502 having a three-by-three (3×3) arrangement, though any suitable number of fine-pitch sensor electrodes 502 and/or their arrangement may be alternately selected. Further, while the profile 520-X, 520-Y of each coarse-pitch sensor electrode 505 is shown as substantially overlapping each of the corresponding fine-pitch sensor electrodes 502, other embodiments may include one or more coarse-pitch sensor electrodes 505 that partly overlap some or all of the corresponding fine-pitch sensor electrodes 502.

Employing multiple layers of overlapping sensor electrodes provides numerous benefits for improved input sensing performance and/or reduced power consumption. In some embodiments, the coarse-pitch sensor electrodes 505 in a first sensing mode are used to perform lower-resolution sensing of an input object such as detecting a hovering object, e.g., a user's face or hand. When an input object is detected in the first mode, a second sensing mode is entered and a "focused" portion of the fine-pitch sensor electrodes 502 are operated to provide a higher-resolution sensing of the input object. In other words, those fine-pitch sensor electrodes 502 that are associated with the particular coarse-pitch sensor electrode(s) 505 that detected the input object are operated in the second sensing mode. A SNR of the input sensing may generally be increased using a focused approach, since relatively more sensing time (or sensing cycles) is spent sensing within a particular region of interest, instead of scanning the full sensing region of the input device. Additionally, the focused approach may reduce power consumption by requiring less receiver circuitry to process received signals from the selected portion of fine-pitch sensor electrodes 502.

Further, the multiple layers of overlapping sensor electrodes may be operated in a number of distinct sensing modes to selectively prioritize sensing performance or power conservation, and/or to enable advanced sensing features. One non-limiting example of an advanced sensing feature is sensing a three-dimensional state of an input object, e.g., determining an orientation of the input object. Another non-limiting example of an advanced sensing feature is contemporaneously performing absolute capacitive sensing and transcapacitive sensing, which can provide improved sensing performance during a particular length of sensing window (e.g., a better correlation of signal or noise due to contemporaneous sensing) and/or support greater display performance (e.g., higher resolutions and/or frame rates) by requiring a smaller sensing window for suitable sensing performance. In such an embodiment, the different sensor electrodes 502, 505 may be modulated differently (i.e., driven with different signals having one or more of different polarities, amplitudes, phases, codes, etc.). Other advanced sensing features are also possible and are within the understanding of the person of ordinary skill in the art.

A plurality of routing traces $530_1$, $530_2$, $530_3$ (generically, routing trace(s) 530) is coupled with corresponding fine-pitch sensor electrodes 502. The routing traces 530 generally couple the fine-pitch sensor electrodes 502 with a processing system for transmitting and/or receiving signals. The routing traces 530 may be formed of an optically transmissive material, or may be formed of a non-transmissive material and dimensioned and arranged such that the routing traces 530 are substantially transmissive to a viewer. The routing traces 530 may be disposed at a different layer than the fine-pitch sensor electrodes 502, and connected through vias or other suitable conductive means. In some embodiments, each fine-pitch sensor electrode 502 is coupled with a respective routing trace 530. While the total number of routing traces 530 is increased for such an embodiment, sensing may be performed with greater resolution, reducing power consumption and preventing undesired noise from other driven sensor electrodes. In other embodiments, and as shown, at least two fine-pitch sensor electrodes 502 are coupled with a common routing trace 530. For example, each routing trace 530 can be connected to as many as one fine-pitch sensor electrode 502 corresponding to each coarse-pitch sensor electrode 505, thereby forming unique transcapacitive sensing nodes between each fine-pitch sensor electrode 502 and corresponding coarse-pitch sensor electrode 505.

A plurality of routing traces 535 are coupled with the coarse-pitch sensor electrodes 505 and with a processing system for transmitting and/or receiving signals. The routing traces 535 may be formed of an optically transmissive material, or may be formed of a non-transmissive material and dimensioned and arranged such that the routing traces 530 are substantially transmissive to a viewer. In one embodiment, the routing traces 535 and the coarse-pitch sensor electrodes 505 are formed of a same wire mesh material. In another embodiment, the routing traces 535 and coarse-pitch sensor electrodes 505 are formed of different materials. In some cases, the routing traces 535 are disposed on a same layer as the coarse-pitch sensor electrodes 505.

Although shown as being routed along the Y-dimension between adjacent coarse-pitch sensor electrodes 505, the routing traces 535 may have any suitable alternate arrangement. Beneficially, having fewer routing traces 530, 535 arranged near an edge of the input device allows for improved sensitivity for side-touch (or grip) sensing applications. Further, fewer routing traces 530, 535 near an edge of the input device may support a reduced-size bezel member or a bezel-free design for the input device.

FIG. 6 is a chart describing a plurality of predefined sensing modes, according to one embodiment. Specifically, the chart 600 illustrates exemplary operation of the coarse-pitch sensor electrodes 505 and fine-pitch sensor electrodes 502 within various sensing modes 605. The chart 600 further includes non-limiting example applications 610, which may be benefited (e.g., improved sensing performance and/or reduced power consumption) by using the associated sensing mode 605. Note that alternate applications, combinations of applications, and/or benefits may be realized for the depicted sensing modes 605, and that other suitable sensing modes may further be realized using the arrangement of coarse-pitch sensor electrodes 505 and fine-pitch sensor electrodes 502. Note further that, although capacitive sensing signals are discussed as being driven onto sensor electrodes in the different modes 605, the capacitive sensing signals may be the same for different modes 605 or may differ within different modes 605, e.g., in one or more of phase, frequency, amplitude, number of sensing bursts, and so forth.

In an absolute capacitive (abscap) mode 615, the coarse-pitch sensor electrodes 505 are driven with capacitive sensing signals, and are used to sense resulting signals comprising effects of the driven capacitive sensing signals. The presence of input objects within an associated sensing region generally influences the resulting signals. The resulting signals may be processed to determine a presence or absence of input object(s), a location of the input object(s), and so forth. The fine-pitch sensor electrodes 502 may optionally be driven with a guard signal to mitigate capacitive effects of the fine-pitch sensor electrodes 502 on the resulting signals. As discussed above, a guard signal may be a varying voltage signal having at least one of a similar phase, frequency, and amplitude as the capacitive sensing signals driven onto the coarse-pitch sensor electrodes 505. The abscap mode 615 may be suitable for operating the associated processing system within a low-power mode (e.g., a "doze" mode), for a face detection mode, and/or for a proximity sensing mode. The abscap mode 615 generally achieves a greater sensing distance due to driving a relatively large coarse-pitch sensor electrode 505 and through guarding the coarse-pitch sensor electrode 505. The abscap mode 615 may further be suitable for capturing a sensing frame corresponding to the entire sensing region of the input device using as little as a single sensing burst within the driven capacitive sensing signals.

In a partial transcapacitive (transcap) mode 620, a first portion of the coarse-pitch sensor electrodes 505 are driven with capacitive sensing signals, and a second portion of the coarse-pitch sensor electrodes 505 are grounded. Alternately, the second portion of the coarse-pitch sensor electrodes 505 may be coupled with any alternate constant voltage or electrically floated. The fine-pitch sensor electrodes 502 are used to sense resulting signals. The first portion may be dynamically selected as representing an area of interest for sensing. In some embodiments, the first portion is determined responsive to determining an approach of an input device within another mode, such as absolute capacitive mode 615 or a combined mode 635. In other embodiments, dynamic selection of the first portion may be occur within partial transcap mode 620 based on the location of previous input objects. The partial transcap mode 620 may be suitable for an active input device (i.e., a pen or other input object emitting a signal) detection mode, for sensing a gesture to wake the processing system (e.g., from a doze mode), for a grip detection mode. The partial transcap mode 620 may also be suitable to compensate for slower sensor electrode implementations. The "focused" sensing within partial transcap mode 620 may result in reduced power consumption, a greater sensor responsiveness, and/or a higher SNR.

In a transcapacitive mode 625, the fine-pitch sensor electrodes 502 are driven with capacitive sensing signals and the resulting signals are received by the coarse-pitch sensor electrodes 505. The transcapacitive mode 625 is suitable for multiple input object tracking. The transcapacitive mode 625 may be suitable to avoid an input device shadow effect, for input devices having a thin lens layer, to avoid bending (force) effects on the received signals, and improved performance in low ground mass situations (e.g., where the input device is not well grounded).

In a combined mode 630, absolute capacitive sensing and transcapacitive sensing are performed contemporaneously. The fine-pitch sensor electrodes 502 are driven with capacitive sensing signals, and resulting signals are received by the coarse-pitch sensor electrodes 505 and by the fine-pitch sensor electrodes 502.

Transcapacitive sensing measurements are performed using the coarse-pitch sensor electrodes 505, and absolute capacitive sensing measurements are performed using the fine-pitch sensor electrodes 502. The combined mode 630 is suitable for a force sensing mode, in which the absolute capacitive sensing measurements are used to determine a change in capacitance between the fine-pitch sensor electrodes 502 and a ground plane disposed nearby. Alternatively, the change in capacitance may be measured with reference to another conductive plate or area that is held at a constant voltage or driven differently than the fine-pitch sensor electrodes 502. The transcapacitive sensing measurements may then be used to mitigate any capacitive effects of input objects affecting the absolute capacitive sensing measurements and thus the force sensing.

In a combined mode 635, absolute capacitive sensing and transcapacitive sensing are performed contemporaneously. The coarse-pitch sensor electrodes 605 are driven with capacitive sensing signals and resulting signals are received by the coarse-pitch sensor electrodes 505 and by the fine-pitch sensor electrodes 502. Transcapacitive sensing measurements are performed using the fine-pitch sensor electrodes 502, and absolute capacitive sensing measurements are performed using the coarse-pitch sensor electrodes 505. The combined mode 635 is suitable for performing "stereoscopic" sensing of input object(s). Stereoscopic sensing may be used within a side touch mode, a pen angle detection mode, and/or a knuckle detection mode. The combined mode 635 may further be suitable for capturing a sensing frame corresponding to the entire sensing region of the input device using as little as a single sensing burst within the driven capacitive sensing signals.

Figure 7:
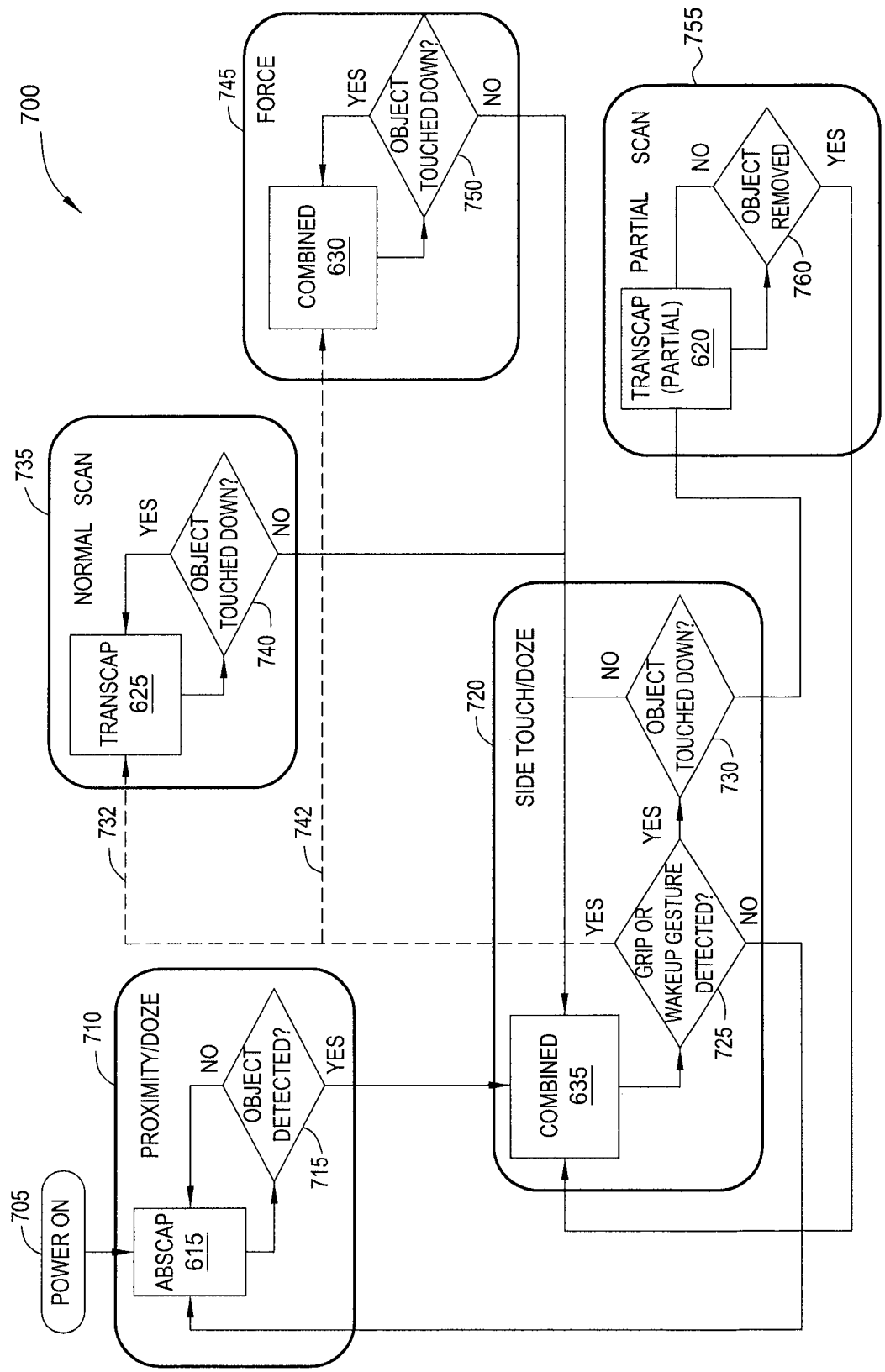
FIG. 7 is a state machine diagram including the plurality of predefined sensing modes, according to one embodiment.

FIG. 7 is a state machine diagram including the plurality of predefined sensing modes, according to one embodiment. More specifically, the diagram 700 illustrates a plurality of modes of a processing system of an input device that correspond to different predefined sensing modes discussed above.

Upon powering on the processing system at block 705, the processing system may enter a first operational mode 710 comprising a proximity sensing mode or doze mode. The processing system may operate in the absolute capacitive sensing mode 615 within the first operational mode 710. If an input object is not detected at block 715 (NO), the processing system remains in the first operational mode 710. Upon determining that an input object is detected at block 715 (YES), the processing system transitions to a second operational model 720 comprising a side-touch mode or doze mode.

The processing system may operate in the combined sensing mode 635 within the second operational mode 720. If a predefined grip or wakeup gesture is not detected at block 725 (NO), the processing system returns to the first operational mode 710. If the predefined grip or wakeup gesture is detected (YES), the processing system determines at block 730 whether the input object has touched down on the input device. Generally, "touching down" refers to a state in which the input object is determined to be in contact with a top-most layer (such as lens layer of FIG. 4) and within a two-dimensional sensing area defined by the sensing surface, as compared with the input object "hovering" above the sensing area, or the input object being disposed outside the sensing area (such as a side grip). If the input object has not touched down (NO), the processing system remains in the second operational mode 720.

However, if the input object has touched down (YES), the processing system transitions into a third operational mode 755 comprising a partial scan mode. Within third operational mode 755, the processing system may operate in the partial transcap mode 620 until determining the input object has been removed at block 760 (YES). The processing system returns to the second operational mode 720.

In some alternate embodiments, upon detecting the predefined grip or wakeup gesture is at block 725 (YES), the processing system may take path 732 to a fourth operational mode 735 or take path 742 to a fifth operational mode 745. The fourth operational mode 735 comprises a normal scan mode, and the fifth operational mode 745 comprises a force sensing mode. In some cases, a host processor of the input device communicates with the processing system to transition along path 732 or 742. For example, the host processor indicates that force sensing is required within a particular application, causing the processing system to transition to the fifth operational mode 745. In another example, the host processor indicates that sensing stability is to be prioritized over one or more of power conservation, sensor responsiveness, and a SNR of input sensing, causing the processing system to transition to the fourth operational mode 735. Upon determining the input object has not touched down at block 740 or 750, the processing system returns from the fourth operational mode 735 or fifth operational mode 745 to the second operational mode 720.

Figure 8:
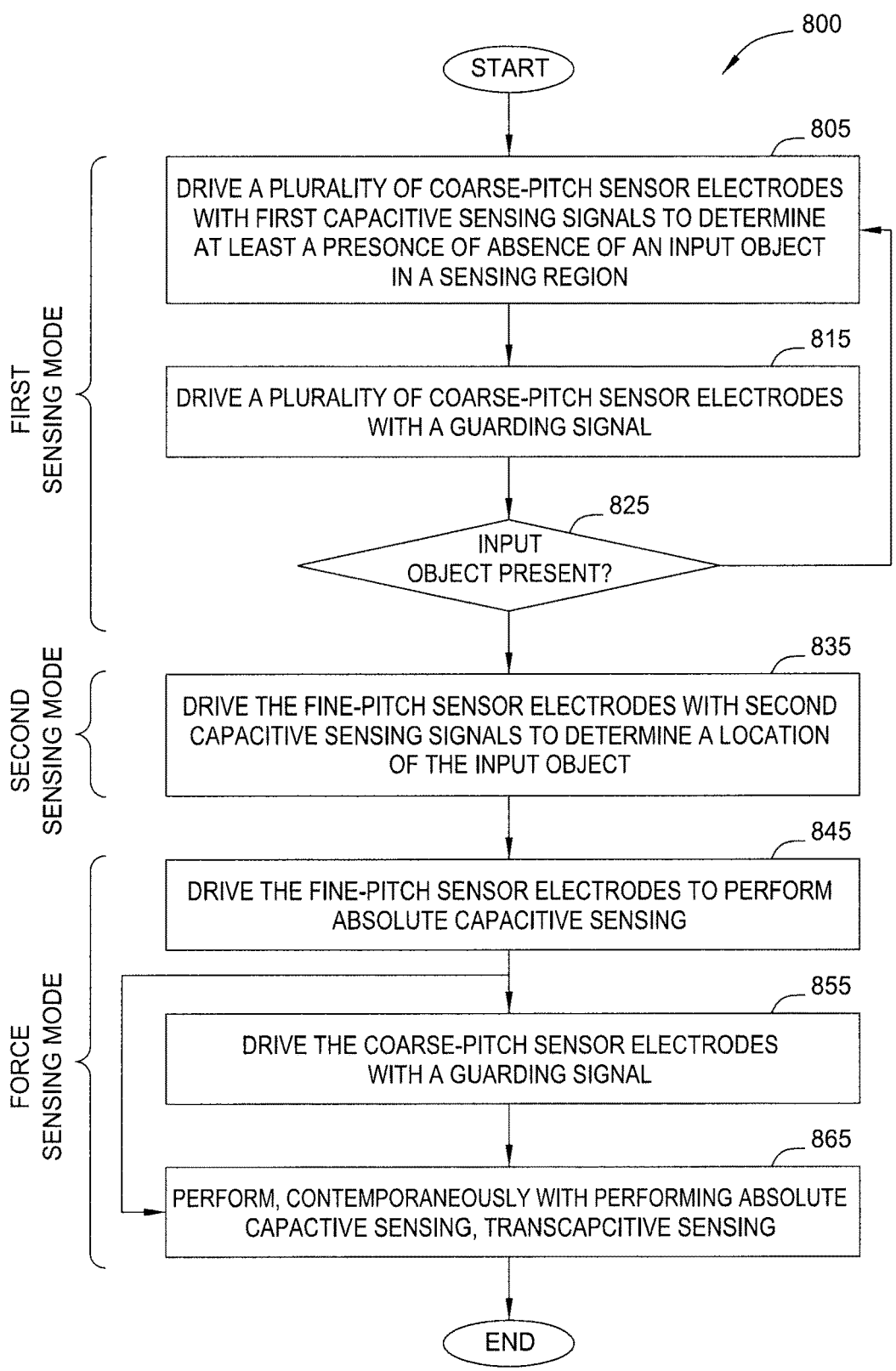
FIG. 8 illustrates a method of operating an input device comprising a plurality of layers and defining a sensing region, according to one embodiment.

FIG. 8 illustrates a method of operating an input device comprising a plurality of layers and defining a sensing region, according to one embodiment. Method 800 is generally intended to be used in conjunction with the various embodiments discussed above. Further, the blocks of method 800 may differ in order, and alternate embodiments of method 800 may include more or less blocks.

Method 800 begins at block 805, where a plurality of coarse-pitch sensor electrodes is driven with first capacitive sensing signals to determine at least a presence or absence of an input object in a sensing region. In some embodiments, the coarse-pitch sensor electrodes receive resulting signals for absolute capacitive sensing. At block 815, a plurality of fine-pitch sensor electrodes is driven with a guarding signal. Generally, blocks 805 and 815 are performed by a processing system operating within a first sensing mode. At block 825, and within the first sensing mode, the processing system determines whether an input object is present. If no input object is present (NO), method 800 returns to block 805 and remains in the first sensing mode.

If an input object is present (YES), the processing system transitions into a second sensing mode. At block 835, the plurality of fine-pitch sensor electrodes are driven with second capacitive sensing signals to determine a location of the input object. In some embodiments, a relatively coarse location of the input object is determined using the plurality of coarse-pitch sensor electrodes, and a refined location of the input object is determined using the fine-pitch sensor electrodes. In some embodiments, the plurality of fine-pitch sensor electrodes driven with second capacitive sensing signals represents only a portion of the fine-pitch sensor electrodes included in the input device. The portion of fine-pitch sensor electrodes are selected to be driven based on overlapping with the coarse-pitch sensor electrode(s) that detected the input object.

The processing system may optionally proceed to a force sensing mode. At optional block 845, the fine-pitch sensor electrodes are driven to perform absolute capacitive sensing. The method 800 proceeds to one of optional blocks 855 and 865. At block 855, the coarse-pitch sensor electrodes are driven with a guarding signal. At block 865, the processing system performs transcapacitive sensing contemporaneously with performing absolute capacitive sensing. In one alternate embodiment, additional receiver electrode(s) disposed beneath the fine-pitch sensor electrodes may be configured to receive signals as the fine-pitch sensor electrodes are deflected. In another alternate embodiment, force sensing is completed by driving the fine-pitch sensor electrodes as transmitter electrodes for touch sensing but also measuring the absolute capacitance between the fine-pitch sensor electrodes and other conductor(s) toward which the fine-pitch sensor electrodes are deflected. Method 800 ends following completion of block 865.

Figure 9:
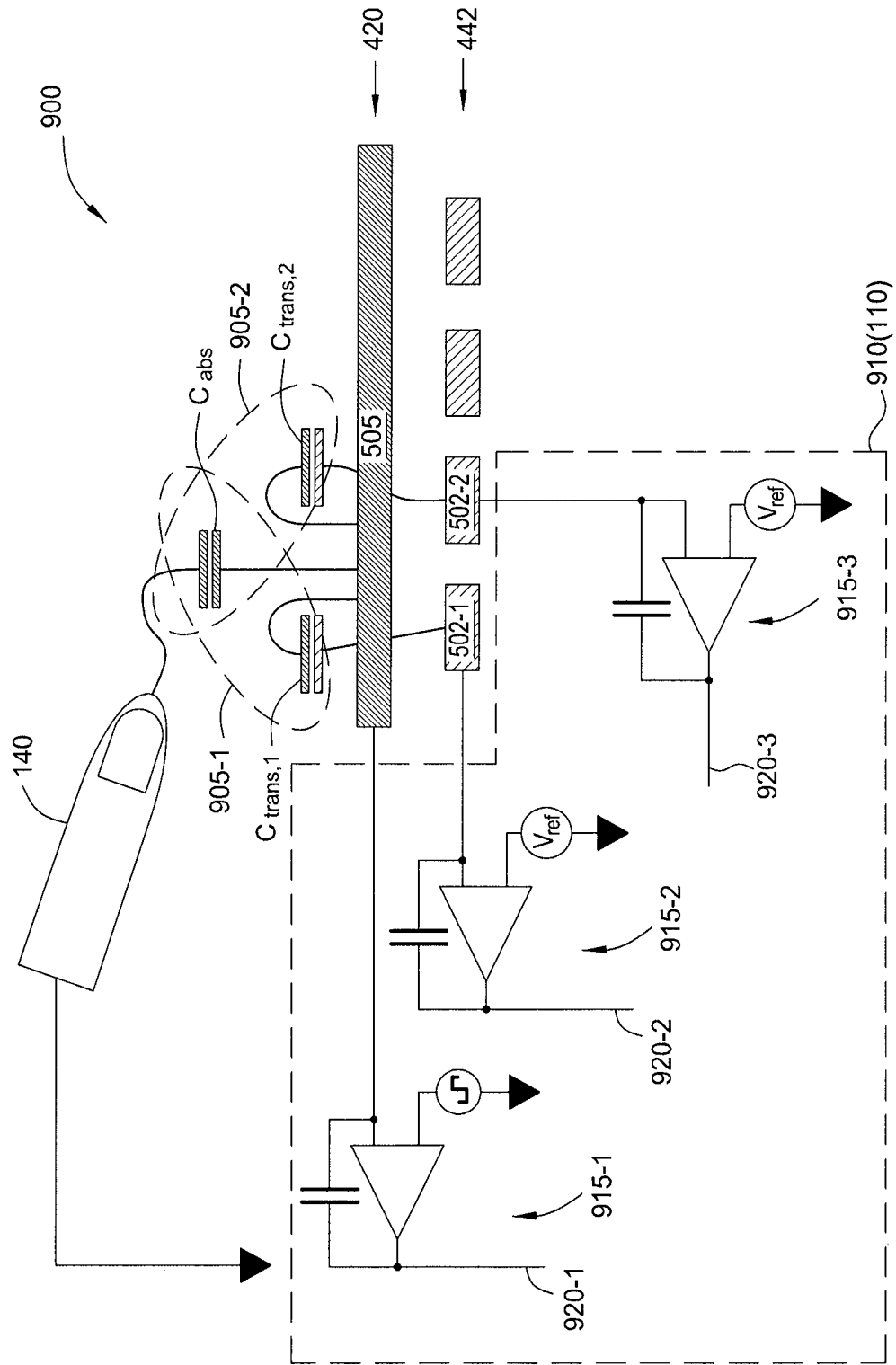
FIGS. 9 and 10 illustrate contemporaneous performance of absolute capacitive sensing and transcapacitive sensing, according to one embodiment.
Figure 10:
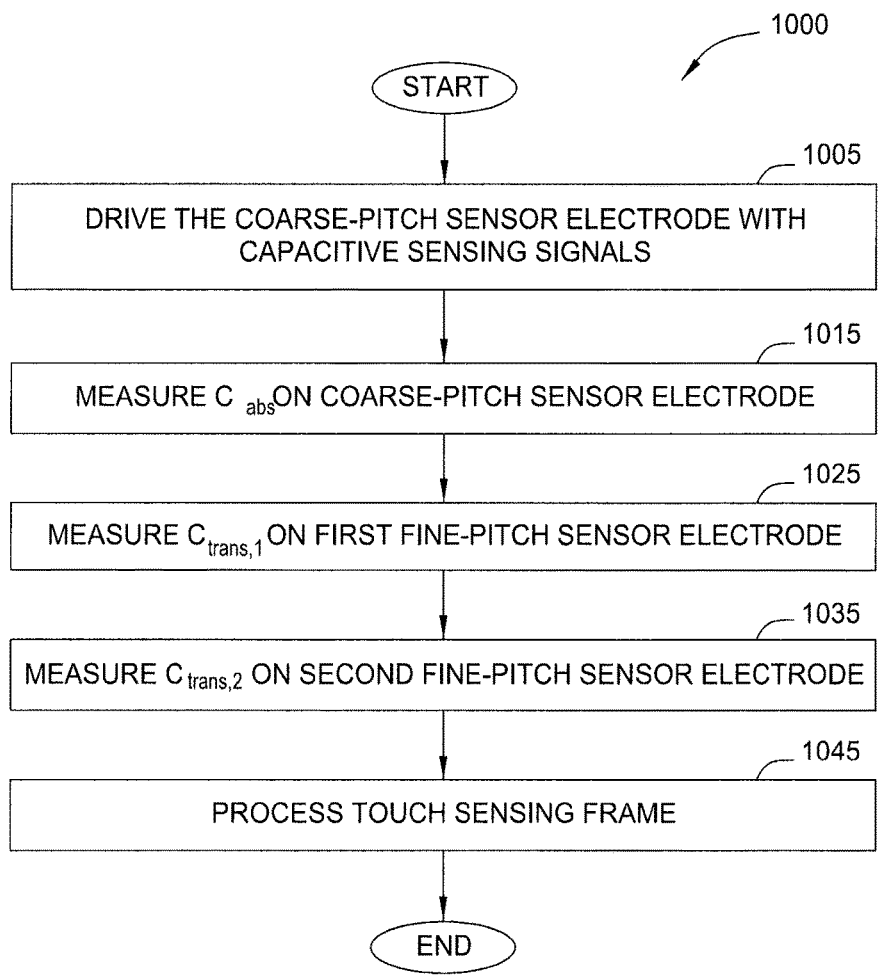

FIGS. 9 and 10 illustrate contemporaneous performance of absolute capacitive sensing and transcapacitive sensing, according to one embodiment. Although the operation of the processing system 110 is described with respect to one coarse-pitch sensor electrode 505 and two fine-pitch sensor electrodes 502, the person of ordinary skill will understand that the numbers of coarse-pitch sensor electrodes 505 and fine-pitch sensor electrodes 502 may vary in different sensing implementations.

Method 1000 begins at block 1005, where the coarse-pitch sensor electrode 505 is driven with capacitive sensing signals. The presence of a grounded input object 140 within the sensing region affects the resulting signals that are received by the coarse-pitch sensor electrode 505, and fine-pitch sensor electrodes 502-1, 502-2. At block 1015, a capacitance $C_{abs}$ on the coarse-pitch sensor electrode 505 is measured. The capacitance $C_{abs}$ reflects effects of a first sensing node 905-1 and a second sensing node 905-2. At block 1025, a capacitance $C_{trans,1}$ is measured on the first fine-pitch sensor electrode 502-1. At block 1035, a capacitance $C_{trans,2}$ is measured on the second fine-pitch sensor electrode 502-2. The capacitance $C_{trans,1}$ represents effects of the first sensing node 905-1, and the capacitance $C_{trans,2}$ represents effects of the second sensing node 905-2. In some embodiments, blocks 1015, 1025, and 1035 are performed contemporaneously.

Relative to a footprint of an input object being sensed, the first and second sensing nodes 905-1, 905-2 defined by fine-pitch sensor electrodes 502-1, 502-2 are spaced closer together (i.e., a smaller pitch) such that the responses from the sensing nodes may be interpolated to extract a more precise position (center) of the input object. In contrast, the sensing nodes defined by coarse-pitch sensor electrodes 505 (e.g., for absolute capacitive sensing) may have their responses affected by a portion of an input object that is not in contact with the sensing surface.

The measurements of capacitances $C_{abs}$, $C_{trans,1}$, and $C_{trans,2}$ are performed using receiver circuitry 910 of processing system 110. In some embodiments, the receiver circuitry 910 may be included within analog front-ends (AFEs) of the processing system 110. As shown, the coarse-pitch sensor electrode 505 is coupled with a first integrator 915-1. The resulting signals received by the coarse-pitch sensor electrode 505 are referenced with the driven capacitive sensing signals and integrated, and the integration value is measured at an output node 920-1. The first fine-pitch sensor electrode 502-1 is coupled with a second integrator 915-2. The resulting signals received by the first fine-pitch sensor electrode 502-1 are referenced with a reference voltage $V_{ref}$ and integrated, and the integration value is measured at an output node 920-2. The reference voltage $V_{ref}$ may be any suitable DC voltage. In one embodiment, to maximize a dynamic range of the receiver circuitry 910, the reference voltage $V_{ref}$ is set to a mid-point of the voltage swing of the driven capacitive sensing signals (i.e., the reference voltage of the first integrator 915-1). The second fine-pitch sensor electrode 502-2 is coupled with a third integrator 915-3. The resulting signals received by the second fine-pitch sensor electrode 502-2 are referenced with the reference voltage and integrated, and the integration value is measured at an output node 920-3.

At block 1045, the processing system 100 processes the touch sensing frame using the measured capacitances $C_{abs}$, $C_{trans,1}$, and $C_{trans,2}$. Method 1000 ends following completion of block 1045.

Figure 11:
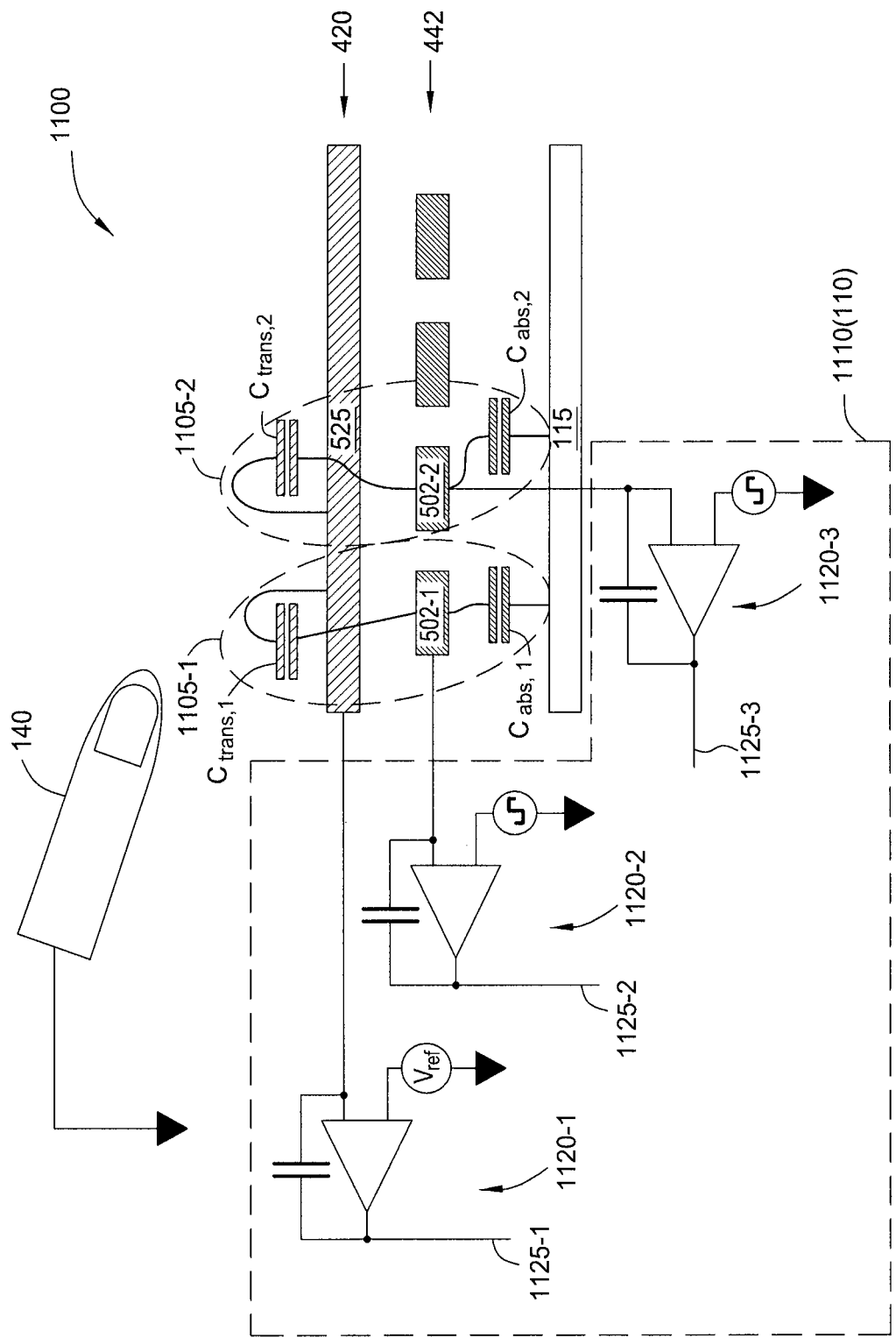
FIGS. 11 and 12 illustrate performance of a sequence of contemporaneous absolute capacitive sensing and transcapacitive sensing, according to one embodiment.
Figure 12:
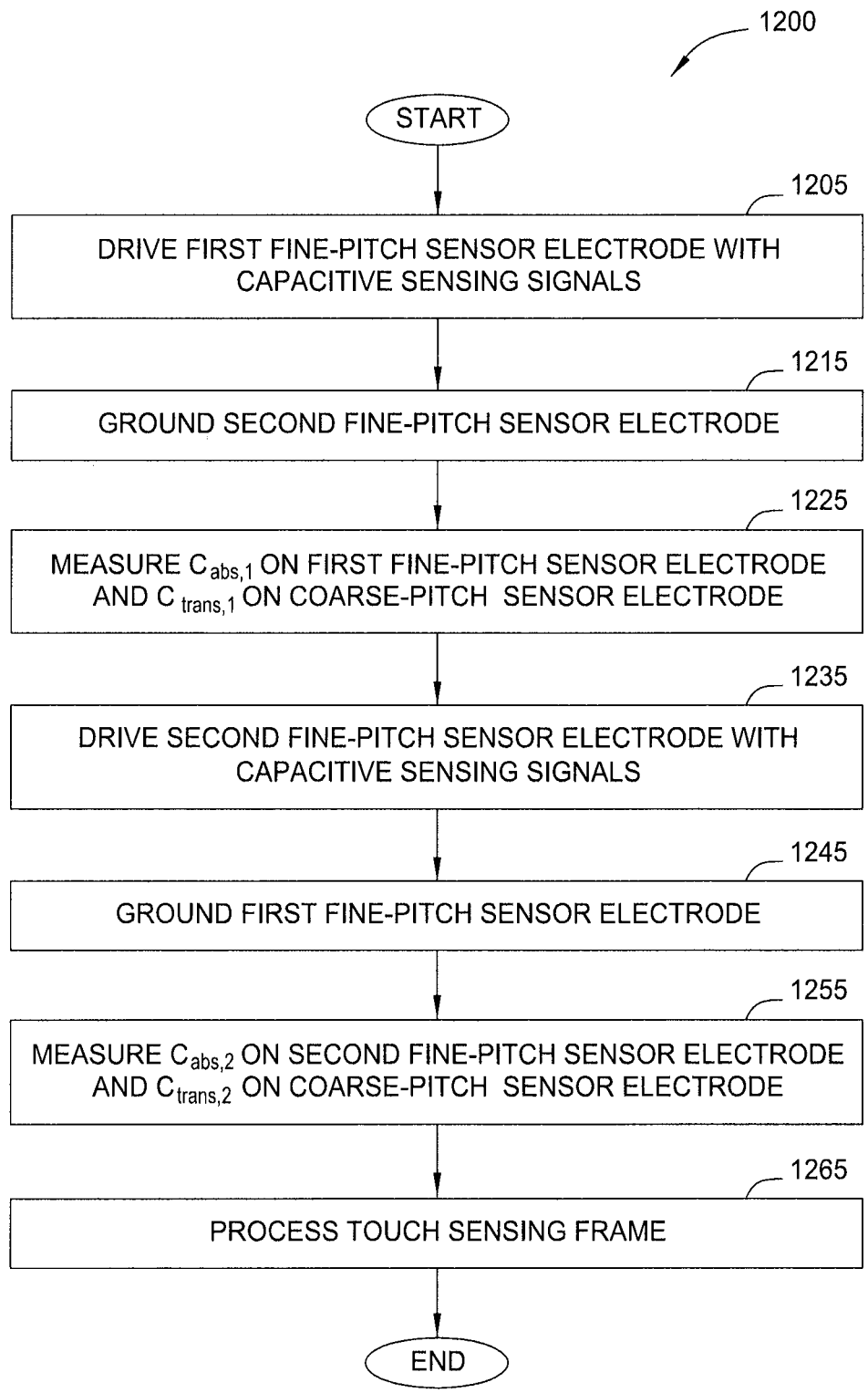

FIGS. 11 and 12 illustrate performance of a sequence of contemporaneous absolute capacitive sensing and transcapacitive sensing, according to one embodiment. In some embodiments, the diagram 1100 and/or method 1200 is used to perform force sensing of input objects 140. Although the operation of the processing system 110 is described with respect to one coarse-pitch sensor electrode 505 and two fine-pitch sensor electrodes 502, the person of ordinary skill will understand that the numbers of coarse-pitch sensor electrodes 505 and fine-pitch sensor electrodes 502 may vary in different sensing implementations.

Method 1200 begins at block 1205, where a first fine-pitch sensor electrode 502-1 is driven with capacitive sensing signals. At block 1215, a second fine-pitch sensor electrode 502-2 is grounded. In some embodiments, blocks 1205 and 1215 are performed contemporaneously. The presence of a grounded input object 140 within the sensing region affects the resulting signals that are received by the coarse-pitch sensor electrode 505, and fine-pitch sensor electrodes 502-1, 502-2. At block 1225, a capacitance $C_{abs,1}$ is measured on the first fine-pitch sensor electrode 502-1, and a capacitance $C_{trans,1}$ is measured on the coarse-pitch sensor electrode 505. The capacitance $C_{abs,1}$ generally reflects a capacitance between the first fine-pitch sensor electrode 502-1 and a ground plane 1115 of the input device. The capacitances $C_{abs,1}$, $C_{trans,1}$ each reflect effects of a first sensing node 1105-1.

At block 1235, the second fine-pitch sensor electrode 502-2 is driven with capacitive sensing signals. At block 1245, the first fine-pitch sensor electrode 502-1 is grounded. In some embodiments, blocks 1235 and 1245 are performed contemporaneously. At block 1255, a capacitance $C_{abs,2}$ is measured on the second fine-pitch sensor electrode 502-2, and a capacitance $C_{trans,2}$ is measured on the coarse-pitch sensor electrode 505. The capacitance $C_{abs,2}$ generally reflects a capacitance between the second fine-pitch sensor electrode 502-2 and the ground plane 1115. The capacitances $C_{abs,2}$, $C_{trans,2}$ each reflect effects of a second sensing node 1105-2.

The measurements of capacitances $C_{abs,1}$, $C_{abs,2}$, $C_{trans,1}$, and $C_{trans,2}$ are performed using receiver circuitry 1110 of processing system 110. In some embodiments, the receiver circuitry 1110 may be included within analog front-ends (AFEs) of the processing system 110. As shown, the coarse-pitch sensor electrode 505 is coupled with a first integrator 1120-1. The resulting signals received by the coarse-pitch sensor electrode 505 are referenced with a reference voltage ($V_{ref}$) and integrated, and the integration value is measured at an output node 1125-1.

The first fine-pitch sensor electrode 502-1 is coupled with a second integrator 1120-2. The resulting signals received by the first fine-pitch sensor electrode 502-1 are referenced with the driven capacitive sensing signals and integrated, and the integration value is measured at an output node 1125-2. The second fine-pitch sensor electrode 502-2 is coupled with a third integrator 1120-3. The resulting signals received by the second fine-pitch sensor electrode 502-2 are referenced with the driven capacitive sensing signals and integrated, and the integration value is measured at an output node 1125-3.

At block 1265, the processing system 100 processes the touch sensing frame using the measured capacitances $C_{abs,1}$, $C_{abs,2}$, $C_{trans,1}$, and $C_{trans,2}$. In some embodiments, the values of $C_{abs,1}$, $C_{abs,2}$ are adjusted using respective values of $C_{trans,1}$, and $C_{trans,2}$. In this way, capacitive effects caused by the presence of an input object 140 can be mitigated and the force sensing measurement (reflected in capacitances $C_{abs,1}$, $C_{abs,2}$) improved. Method 1200 ends following completion of block 1265.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. An input device comprising:
a lens layer;
a display device comprising a plurality of layers, the plurality of layers comprising a display activation layer;
a plurality of first sensor electrodes arranged with a first sensor pitch on a first layer of the plurality of layers, each first sensor electrode comprising at least one display electrode of a plurality of display electrodes; and
a plurality of second sensor electrodes arranged with a second sensor pitch on a second layer between the display activation layer and the lens layer, the second sensor pitch greater than the first sensor pitch along at least one dimension of a sensing region of the input device,
wherein each first sensor electrode and each second sensor electrode has a substantially equilateral profile within first and second dimensions of the sensing region, and
wherein the substantially equilateral profile of each second sensor electrode entirely overlaps the substantially equilateral profiles of multiple first sensor electrodes of the plurality of first sensor electrodes.

2. The input device of claim 1, wherein the second sensor pitch is greater than the first sensor pitch along two or more dimensions of the sensing region.

3. The input device of claim 1, further comprising:
a processing system configured to:
operate the plurality of second sensor electrodes in a first predefined sensing mode by driving the plurality of second sensor electrodes with first capacitive sensing signals to determine a presence or absence of an input object in the sensing region; and
operate, based on a determination of the presence of the input object in the sensing region, the plurality of first sensor electrodes in a second predefined sensing mode by driving the plurality of first sensor electrodes with second capacitive sensing signals to determine a location of the input object.

4. The input device of claim 1, wherein at least two first sensor electrodes are coupled with a common routing trace.

5. The input device of claim 1, wherein the plurality of layers further comprises a color filter glass layer, wherein the second layer is disposed between the color filter glass layer and the lens layer.

6. The input device of claim 1, wherein the plurality of first sensor electrodes are disposed in a rectangular array configuration.

7. The input device of claim 1, wherein each second sensor electrode is arranged in a respective lattice configuration.

8. The input device of claim 7, wherein each second sensor electrode is comprised of a wire mesh material.

9. The input device of claim 7,
wherein each first sensor electrode is bounded in a first dimension of the sensing region by two electrode segments of the overlapping second sensor electrode, and wherein each first sensor electrode is overlapped in a second dimension of the sensing region by at least one electrode segment of the overlapping second sensor electrode.

10. A processing system for an input device, the processing system comprising:
sensing circuitry configured to couple with a plurality of first sensor electrodes and a plurality of second sensor electrodes,
the plurality of first sensor electrodes arranged with a first sensor pitch at a first layer of the input device, each first sensor electrode comprising at least one display electrode of a plurality of display electrodes,
the plurality of second sensor electrodes arranged with a second sensor pitch at a second layer between a display activation layer and a lens layer of the input device, the second sensor pitch greater than the first sensor pitch along at least one dimension of a sensing region of the input device,
wherein the sensing circuitry is further configured to:
operate the plurality of second sensor electrodes in a first predefined sensing mode by:
driving the plurality of second sensor electrodes with first capacitive sensing signals; and
determining at least a presence or absence of an input object in a sensing region of the input device, wherein each first sensor electrode and each second sensor electrode has a substantially equilateral profile within first and second dimensions of the sensing region, and wherein the substantially equilateral profile of each second sensor electrode entirely overlaps the substantially equilateral profiles of multiple first sensor electrodes of the plurality of first sensor electrodes; and
operate, based on a determination of the presence of the input object in the sensing region, the plurality of first sensor electrodes in a second predefined sensing mode by:
determining an initial location of the input object in two or more dimensions of the sensing region by identifying one or more second sensor electrodes of the plurality of second sensor electrodes that determined the presence of the input object; and
driving a portion of the plurality of first sensor electrodes with second capacitive sensing signals to determine a refined location of the input object in the two or more dimensions,
wherein the portion comprises one or more first sensor electrodes that overlap with the identified one or more second sensor electrodes.

11. The processing system of claim 10, further comprising:
display driver circuitry coupled with the plurality of display electrodes, wherein the plurality of display electrodes comprises a plurality of common electrodes.

12. The processing system of claim 10, wherein the sensing circuitry is further configured to:
drive, within the first predefined sensing mode, the plurality of first sensor electrodes with a guarding signal.

13. The processing system of claim 10, wherein the sensing circuitry is further configured to:
drive, within a third predefined sensing mode, the plurality of second sensor electrodes to:
perform absolute capacitive sensing using the second plurality of sensor electrodes; and
perform, contemporaneously with performing absolute capacitive sensing, transcapacitive sensing between the plurality of first sensor electrodes and the plurality of second sensor electrodes.

14. The processing system of claim 13, wherein the sensing circuitry is further configured to:
transition from operating in the first predefined sensing mode to operating in the third predefined sensing mode upon determining the presence of the input object in the sensing region; and
transition, upon receiving a predefined gesture within the third predefined sensing mode, from operating in the third predefined sensing mode to operating in the second predefined sensing mode.

15. The processing system of claim 10, wherein the sensing circuitry is further configured to:
drive, within a predefined force sensing mode, the first sensor electrodes to perform absolute capacitive sensing with the first sensor electrodes.

16. The processing system of claim 15, wherein the sensing circuitry is further configured to:
drive, within the predefined force sensing mode, the second sensor electrodes with a guarding signal.

17. The processing system of claim 15, wherein the sensing circuitry is further configured to:
perform, within the predefined force sensing mode and contemporaneously with performing absolute capacitive sensing, transcapacitive sensing between the second sensor electrodes and the first sensor electrodes.

18. A method of operating an input device comprising a plurality of layers and defining a sensing region, the plurality of layers comprising a lens layer and a display activation layer, the method comprising:
operating a plurality of coarse-pitch sensor electrodes in a first predefined sensing mode by driving the coarse-pitch sensor electrodes with first capacitive sensing signals to determine at least a presence or absence of an input object in the sensing region, the coarse-pitch sensor electrodes disposed at a first layer of the plurality of layers; and
operating, based on a determination of the presence of the input object in the sensing region, a plurality of fine-pitch sensor electrodes in a second predefined sensing mode by:
determining an initial location of the input object in two or more dimensions of the sensing region by identifying one or more coarse-pitch sensor electrodes of the plurality of coarse-pitch sensor electrodes that determined the presence of the input object; and
driving a portion of the plurality of fine-pitch sensor electrodes with second capacitive sensing signals to determine a refined location of the input object in the two or more dimensions,
wherein each coarse-pitch sensor electrode and each fine-pitch sensor electrode has a substantially equilateral profile within the two or more dimensions, and wherein the substantially equilateral profile of each coarse-pitch sensor electrode entirely overlaps the substantially equilateral profiles of multiple fine-pitch sensor electrodes,
wherein the portion comprises one or more fine-pitch sensor electrodes that overlap with the identified one or more coarse-pitch sensor electrodes, and
wherein the plurality of fine-pitch sensor electrodes is disposed at a second layer of the plurality of layers between the display activation layer and the lens layer.

19. The method of claim 18, further comprising:
driving, within the first predefined sensing mode, the fine-pitch sensor electrodes with a guarding signal.

20. The method of claim 18, further comprising:
driving, within a predefined force sensing mode, the fine-pitch sensor electrodes to perform absolute capacitive sensing with the fine-pitch sensor electrodes.

21. The method of claim 20, further comprising:
driving, within the predefined force sensing mode, the coarse-pitch sensor electrodes with a guarding signal.

22. The method of claim 20, further comprising:
performing, within the predefined force sensing mode and contemporaneously with performing absolute capacitive sensing, transcapacitive sensing between the coarse-pitch sensor electrodes and the fine-pitch sensor electrodes.

* * * * *